Z. G. GARLICK.
Cattle Stall Floor.
No. 39,283.
Patented July 21, 1863.
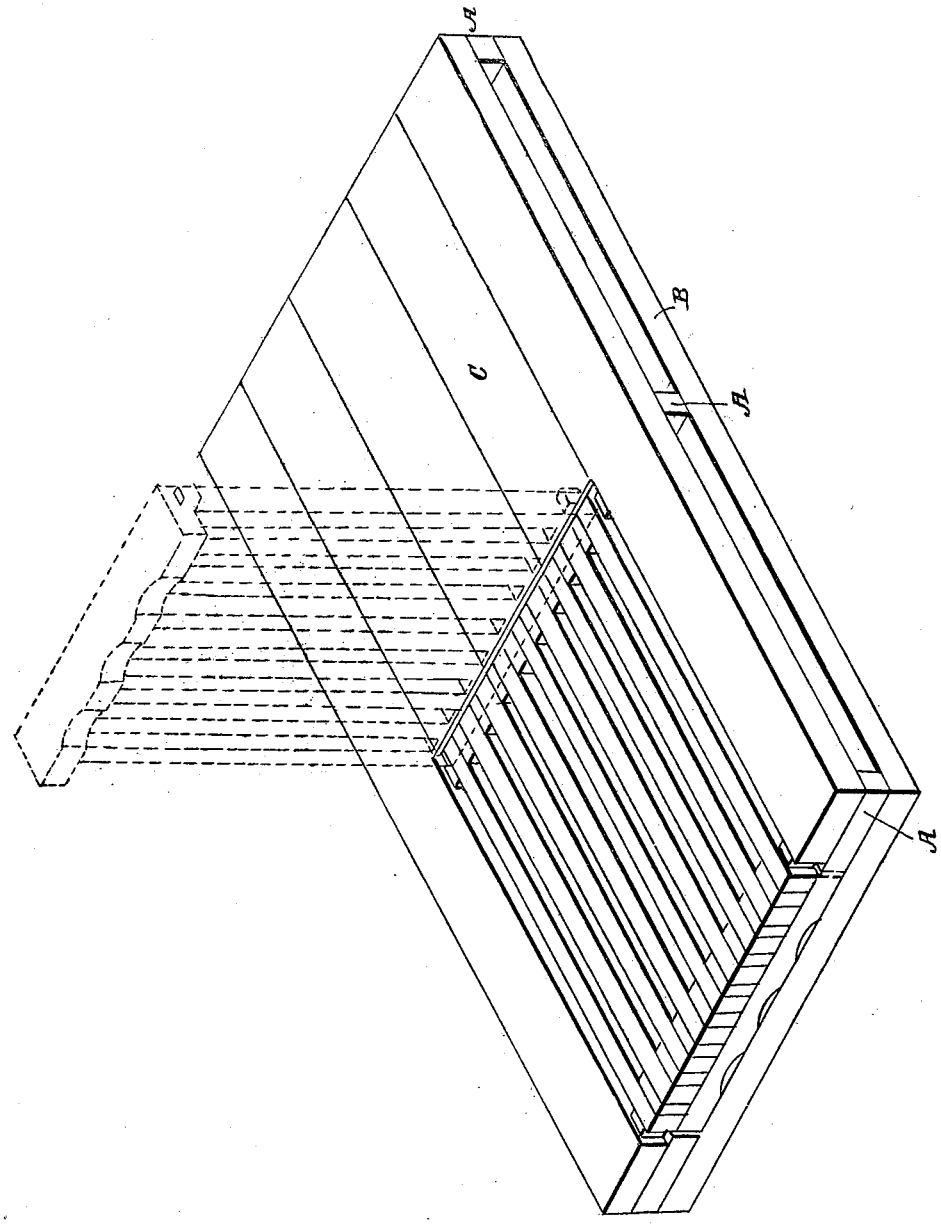

UNITED STATES PATENT OFFICE.

ZEBULON G. GARLICK, OF OTSEGO, NEW YORK.

IMPROVEMENT IN FLOORS FOR STALLS.

Specification forming part of Letters Patent No. 39,283, dated July 21, 1863.

*To all whom it may concern:*

Be it known that I, ZEBULON G. GARLICK, of the city and county of Otsego, in the State of New York, have invented a new and useful Improvement in the Construction of Floors for Horse and Cattle Stalls; and I do hereby declare that the following is a full, clear, and exact description of the same, reference being had to the accompanying drawing, making part of this specification, in which my invention is represented by a perspective view.

The nature of my invention consists in providing animal-stalls with a secondary floor, constructed, in part, of a grate which allows a free escape of urine, and which is hinged at one end so that it can be turned up into a vertical position to admit of the ready removal of any accumulation of manure beneath it and on the stable-floor, whereby the animal is kept clean, dry, and comfortable, as will be hereinafter fully explained.

To enable others skilled in the art to which my invention appertains to fully understand and use the same, I will proceed to describe its construction and operation.

I first lay some narrow pieces of wood, A, across the stall and attach them by nails or otherwise to the floor B. Upon these pieces I lay a secondary floor, C, which is constructed of plank, the same as the lower floor, except a portion at the foot or entrance of the stall, which portion I construct in the form of a grate by narrow pieces or bars of wood of about three inches in width by two inches in thickness and about four feet in length, with small blocks of wood of about three inches square by half an inch in thickness interposed between them at each end, and the whole secured together by two bolts, one passing through each end of the grate. The blocks between the bars at each end leave the grate sufficiently open to allow the urine to pass off readily without inconveniencing the animal in standing or lying down. It is also sufficiently close to keep such bedding as is usually provided for horses and cattle from passing through it onto the stall-floor proper. The grate is attached at one end to the fixed portion of the secondary floor by hinges, which admit of its being turned back into the position shown by red lines in the drawing, to allow whatever may have accumulated between it and the main floor of the stall to be removed.

The above-described invention is equally applicable to any kind of animal-stall, requiring no change in the construction to adapt it to any stall, except it may be in the dimensions.

The expense of furnishing a stall with the improvement is merely nominal, compared with the great saving it effects in the health of the animal by keeping him dry, to say nothing of the saving effected in the time and labor required to clean him.

Besides the above, many other obvious advantages result from the use of my invention, which it is not considered necessary here to particularize.

Having thus described my invention, what I claim as new, and desire to secure by Letters Patent, is—

Providing animal-stalls with a secondary floor, formed in part of a movable grate, which is constructed of longitudinal bars, secured together at each end with interstices between them, and attached to the other part of the floor by hinges, so as to operate in the manner and for the purposes specified.

ZEBULON G. GARLICK.

Witnesses:
    S. WILSON CHENEY,
    FAY E. TAYLOR.